United States Patent Office 3,162,624
Patented Dec. 22, 1964

3,162,624
WATER-INSOLUBLE PYRROLIDINONE RESINS
AND METHOD OF PREPARATION
Carl Moore and William F. Tousignant, both of Midland, Mich., assignors to The Dow Chemical Company, Midland, Mich., a corporation of Delaware
No Drawing. Filed Mar. 5, 1962, Ser. No. 177,215
5 Claims. (Cl. 260—88.1)

This invention concerns water-insoluble, polymeric, vinylbenzyl pyrrolidinone resins and their method of preparation.

The present invention makes possible the utilization of the complexing properties of 2-pyrrolidinone groups without the disadvantages of having a water-soluble 2-pyrrolidinone reactant. Until the present time, it was not known how to make a homogeneous, water-insoluble, resinous polymer which would afford both the advantages of its 2-pyrrolidinone groups for forming complexes with aqueous-phase reactants and the advantages of water insolubility, so that a separation could be had from an aqueous medium of a complexed, water-insoluble, resinous, polymeric 2-pyrrolidinone.

It has now been discovered that homogeneous, water-insoluble, polymeric 2-pyrrolidinones can be prepared by reacting an alkali metal salt of a 2-pyrrolidinone having the formula

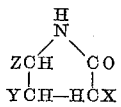

wherein X, Y and Z individually are selected from the group consisting of hydrogen and 1 to 4 carbon alkyl groups, with a chloromethylated vinylaryl polymer having 0.75 to 1.5 chloromethyl groups per available aryl nucleus, crosslinked with between 0.9 and 5 mole percent, vinylaryl polymer basis, of a crosslinking agent having two vinylidene groups, in stoichiometric or substantially stoichiometric proportions.

The reaction schematically is as follows:

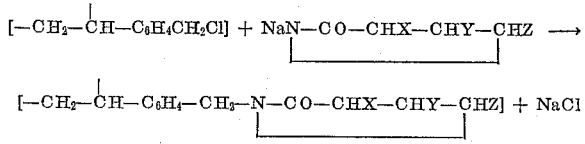

wherein the first reactant represents polymeric vinylbenzyl chloride and the second reactant represents the sodium salt of 2-pyrrolidinone or of its alkyl-substituted derivatives, as specified supra.

The chloromethylated resinous polymers utilized in the process of this invention are those of styrene, o-, m- and p-methylstyrene, o-, m- and p-ethylstyrene, vinylnaphthalene, vinylanthracene, their mixtures and homologs, containing between 0.75 and 1.5 chloromethyl groups per aromatic nucleus and crosslinked with between about 0.9 and 5 mole percent, vinylaryl polymer basis, of a crosslinking agent having two vinylidene groups, e.g., divinylbenzene, divinyltoluene, divinylxylene, divinylethylbenzene, divinylnaphthalene, vinyl acrylate, diacrylate esters, dimethacrylate esters, diallyl esters, methylenebisacrylamide, etc.

Advantageously, the chloromethylated crosslinked copolymers are prepared in two stages. First, a conventional oil-in-water suspension polymerization process, as used in making ion exchange resins having a polymeric styrene matrix, is used wherein resinous vinylaryl polymers, crosslinked as specified, are obtained as discrete beads or spheroids. These latter are then chloromethylated in usual ways, e.g., with a mixture of formaldehyde and hydrochloric acid or a mixture of a dihalide and a Friedel-Crafts catalyst, as described in Organic Reactions, vol. I, page 63 et seq., John Wiley & Sons, Inc., 1942. Alternatively, the chloromethylvinylaryl monomers corresponding to the polymers previously listed, e.g., o-chloromethylstyrene, p-chloromethylstyrene, mixtures thereof, etc., together with crosslinking agent can be polymerized in mass or in organic solution to give products similar to the preceding polymers.

The chloromethylated, crosslinked, vinylaryl polymers are reacted with a stoichiometric or substantially stoichiometric proportion and up to 25 percent excess of an alkali metal salt of a 2-pyrrolidinone, as specified, advantageously formed in situ from the corresponding 2-pyrrolidinone and a free alkali metal or alkali metal alkoxide, advantageously of a 1 to 4 carbon monohydric alcohol. The reaction is advantageously carried out in the presence of an organic swelling agent for the chloromethylated, resinous, vinylaryl polymers, i.e., a swelling agent which swells resinous chloromethylstyrene polymers and does not react with alkali metal or alkali metal alkoxides under reaction conditions, in amount sufficient to provide a fluid, stirrable slurry. Such swelling agents are chloroform, tetra chloroethane, o-dichlorobenzene, cis-dichloroethylene, trichloroethylene, tetralin, pentachloroethane, methylchloroform, dioxane, tetrahydrofuran, dimethylformamide, perchloroethylene, carbon tetrachloride, ethylidenedichloride, chlorobenzene, toluene, ethylbenzene, benzene, xylene and cyclohexane. The 2-pyrrolidinone compound itself, in excess, can also be used as a swelling agent.

The reaction between the polymeric chloromethylvinylaryl resin and the alkali metal 2-pyrrolidinone salt is carried out at a temperature between about 50° and 125° C. for a time sufficient to displace at least 50 percent of the benzylic chloride, which displacement can be followed by periodic analyses. The reaction is carried out at atmospheric, subatmospheric or superatmospheric pressure. Generally atmospheric or substantially atmospheric pressure is most advantageous.

The following examples describe specific embodiments and the best mode contemplated by the inventors of carrying out their invention in polymeric 1-(ar-vinylbenzyl)-2-pyrrolidinones.

Example 1

A quantity of resinous chloromethylated polystyrene beads crosslinked with one percent divinylbenzene of 50–100 U.S. mesh size was thoroughly washed with methanol, then with dry dioxane. A 1-liter glass resin flask was then charged with 250 g. dry dioxane, 22 g. of 2-pyrrolidione, 14.25 g. of sodium methylate powder (95 percent purity), and the dioxane-washed chloromethylated polystyrene beads. Sufficient resin beads were added to give 30.2 g. on a dry basis. The mole ratio of ingredients constituted about 0.18 mole resin, plus 0.25 mole each of 2-pyrrolidinone and sodium methylate.

The contents of the flask were stirred with a glass propeller, nitrogen was slowly flushed into the container and the reaction temperature was maintained at 60° C. for one hour, then raised to 77°–78° C. for 4 hours. A water-cooled condenser open to the air was used throughout to condense any volatiles.

After the 5-hour reaction period, the resin beads were filtered on a Buechner funnel and washed successively with methanol, water and finally methanol. Drying was carried out in a vacuum oven maintained at 50° C. overnight. The product was recovered as cream-colored resin beads and weighed 31 g.

Analysis of the washings by Volhard titration showed a recovery of 2.8 g. (79 milliequivalents) of chloride ion. The resin, which initially had contained 19.0 percent chlorine, was now found to contain 6.7 percent chlorine (Parr ignition analysis). Nitrogen content of the product was 3.22 percent. Based on chlorine loss, the conversion was calculated to be approximately 65 percent.

Equally good results are obtained when 1 to 3 of the 3, 4 and 5 positions on the 2-pyrrolidinone ring are substituted by 1 to 4 carbon alkyl groups.

*Example 2*

The procedure of Example 1 was repeated with 4 percent divinylbenzene-crosslinked chloromethylated polystyrene beads (15.1 percent chlorine), using equimolar quantities of reagents. The product was a resin containing 8.5 percent chlorine and 1.76 percent nitrogen.

*Example 3*

To a 1-liter resin flask fitted with stirrer, condenser, thermowell and nitrogen inlet were charged 200 ml. dry dioxane and 25 g. 2-pyrrolidinone. The temperature was raised to 90° C. and 6.3 g. of sodium metal was slowly added with stirring. The sodium addition was completed in one hour and the temperature was then raised to 100° C. for an additional 2 hours.

The temperature was then lowered to 80° C. and dioxane-washed 50–100 U.S. mesh size chloromethylated polystyrene beads (one percent divinylbenzene as crosslinking agent, chlorine content equal to 19.0 percent) was added. The weight of beads on a dry basis was 46.4 g. An extra 150 ml. dry dioxane was used to transfer the beads to the flask. The reaction mixture was stirred at a moderate speed. Temperature was raised to 90° C. for 30–40 minutes then controlled at 80° C. for an additional 4½ hours.

After this period, the flask contents were cooled, 100 ml. of methanol was added and after one hour the resin beads were washed several times in methanol by decantation, then water washed several times and suction filtered. A last methanol rinse was made when the beads were on the filter funnel. The beads were vacuum dried at 50° C. to constant weight.

The product recovered was 49 g. of yellow beads. Analysis showed 1.77 percent chlorine content and 4.94 percent nitrogen. Based on a 19 percent chlorine content of the starting material, complete conversion to a nitrogen ring system would yield resin containing 5.95 percent nitrogen. With a 4.94 percent nitrogen realized, a conversion that was 83 percent of theoretical was attained.

The resins of this invention can be used for complexing a variety of compounds from a gas phase or from aqueous solutions. For example, one gram of the product of Example 3, dry basis, complexed 0.11 g. phenol when equilibrated with 100 ml. of aqueous 2 percent phenol for 24 hours.

Complexes of the resins of this invention with various compounds are decomposed, and the resins are thereby regenerated, by elution with one of the following aqueous reagents, depending upon the complexed compound: (*a*) dilute, ca. 4 percent, sodium hydroxide; (*b*) dilute, ca. 4 percent, acetic acid; (*c*) dilute, ca. 5 percent, ammonium hydroxide; (*d*) dilute, ca. 2.5 percent, sodium hypochlorite. For example, complexes of the resins of this invention with phenol are eluted with aqueous dilute sodium hydroxide to remove and recover phenol as sodium phenate and to regenerate the resins of this invention.

What is claimed is:

1. Method for making a water-insoluble, resinous, polymeric 1-(ar-vinylbenzyl)-2-pyrrolidinone resin by reacting substantially stoichiometric proportions of an alkali metal salt of a 2-pyrrolidinone having the formula

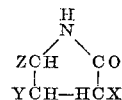

wherein X, Y and Z individually are selected from the group consisting of hydrogen and 1 to 4 carbon alkyl groups, with a resinous ar-chloromethyl-substituted vinylaryl polymer having from about 0.75 to 1.5 chloromethyl groups per aryl nucleus and crosslinked with between 0.9 and 5 mole percent, vinylaryl polymer basis, of a crosslinking agent having two vinylidene groups, at a temperature between about 50° and 125° C. for a time sufficient to displace at least 50 mole percent of benzylic chloride with 2-pyrrolidinone moieties.

2. The method of claim 1 wherein the ar-chloromethyl-substituted vinylaryl polymer is that of styrene.

3. The method of claim 2 wherein the alkali metal salt is that of 2-pyrrolidinone.

4. A resinous polymeric 1-(ar-vinylbenzyl)-2-pyrrolidinone crosslinked with 0.9 to 5 mole percent of a crosslinking agent having two vinylidene groups, the 2-pyrrolidinone moiety having the formula

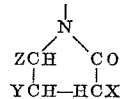

wherein X, Y and Z individually are selected from the group consisting of hydrogen and 1 to 4 carbon alkyl groups.

5. The product of claim 4 wherein the crosslinking agent is divinylbenzene.

References Cited in the file of this patent

FOREIGN PATENTS 1,033,206  Germany _____ July 3, 1958

OTHER REFERENCES

Hale: Research, vol. 9, pages 104–108, 1956.